(12) United States Patent
Kwon et al.

(10) Patent No.: US 9,299,987 B2
(45) Date of Patent: Mar. 29, 2016

(54) CABLE-TYPE SECONDARY BATTERY

(71) Applicant: LG Chem, Ltd., Seoul (KR)

(72) Inventors: Yo-Han Kwon, Daejeon (KR);
Sang-Wook Woo, Daejeon (KR);
Hye-Ran Jung, Busan (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 69 days.

(21) Appl. No.: 14/188,820

(22) Filed: Feb. 25, 2014

(65) Prior Publication Data

US 2014/0170456 A1  Jun. 19, 2014

Related U.S. Application Data

(63) Continuation of application No. PCT/KR2012/008823, filed on Oct. 25, 2012.

(30) Foreign Application Priority Data

Oct. 25, 2011  (KR) .......... 10-2011-0109564
Oct. 25, 2011  (KR) .......... 10-2011-0109565
Oct. 25, 2012  (KR) .......... 10-2012-0118924

(51) Int. Cl.
*H01M 2/26* (2006.01)
*H01M 2/00* (2006.01)
(Continued)

(52) U.S. Cl.
CPC ............ *H01M 4/661* (2013.01); *H01M 4/13* (2013.01); *H01M 4/139* (2013.01); *H01M 4/663* (2013.01);
(Continued)

(58) Field of Classification Search
None
See application file for complete search history.

(56) References Cited

U.S. PATENT DOCUMENTS 1,447,657 A   3/1923  Gouin et al.
3,839,090 A   10/1974  Morelock et al.
(Continued)

FOREIGN PATENT DOCUMENTS

CN   1388993 A   1/2003
CN   103348524 A  10/2013
(Continued)

OTHER PUBLICATIONS

Machine translation of JP 2008-047398, retrieved from <https://www.j-platpat.inpit.go.jp/web/all/top/BTmTopEnglishPage> on May 22, 2015.*

(Continued)

*Primary Examiner* — Cynthia K Walls
(74) *Attorney, Agent, or Firm* — Lerner, David, Littenberg, Krumholz & Mentlik, LLP

(57) ABSTRACT

The present invention relates to a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer, and having an outer electrode active material layer and an outer current collector comprising at least one of a conductive paste and a carbon fiber.

In accordance with the present invention, the outer current collector which comprises a conductive paste or a carbon fiber to have good flexibility is used in a cable-type battery to improve the flexibility of the cable-type battery.

20 Claims, 1 Drawing Sheet

(51) Int. Cl.

| | | |
|---|---|---|
| *H01M 4/66* | (2006.01) | |
| *H01M 4/75* | (2006.01) | |
| *H01M 10/052* | (2010.01) | |
| *H01M 10/058* | (2010.01) | |
| *H01M 4/13* | (2010.01) | |
| *H01M 4/139* | (2010.01) | |
| *H01M 10/04* | (2006.01) | |

(52) U.S. Cl.
CPC .............. *H01M 4/667* (2013.01); *H01M 4/668* (2013.01); *H01M 4/75* (2013.01); *H01M 10/04* (2013.01); *H01M 10/052* (2013.01); *H01M 10/058* (2013.01); *Y02E 60/122* (2013.01)

(56) References Cited

U.S. PATENT DOCUMENTS

| | | |
|---|---|---|
| 3,897,266 A | 7/1975 | Devitt et al. |
| 4,522,897 A | 6/1985 | Walsh |
| 2001/0005561 A1 | 6/2001 | Yamada et al. |
| 2002/0150820 A1* | 10/2002 | Kanai et al. ............... 429/231.1 |
| 2002/0187401 A1 | 12/2002 | Lee et al. |
| 2004/0062958 A1 | 4/2004 | Facchi et al. |
| 2005/0271796 A1 | 12/2005 | Neudecker et al. |
| 2007/0243456 A1 | 10/2007 | Ahn et al. |
| 2009/0123832 A1 | 5/2009 | Chigiri |
| 2010/0203372 A1 | 8/2010 | Kim et al. |
| 2010/0285356 A1 | 11/2010 | Choi et al. |
| 2010/0304274 A1 | 12/2010 | Bennett et al. |
| 2010/0323242 A1 | 12/2010 | Choi et al. |
| 2011/0039156 A1* | 2/2011 | Tu et al. ..................... 429/217 |
| 2011/0117414 A1 | 5/2011 | Choi et al. |
| 2011/0262809 A1* | 10/2011 | Kumagai et al. ............. 429/211 |
| 2012/0009331 A1 | 1/2012 | Kwon et al. |
| 2012/0015233 A1 | 1/2012 | Kwon et al. |
| 2012/0040246 A1 | 2/2012 | Sakai et al. |
| 2012/0156554 A1 | 6/2012 | Kwon et al. |
| 2013/0149580 A1 | 6/2013 | Kim |

FOREIGN PATENT DOCUMENTS

| | | | |
|---|---|---|---|
| EP | 2533328 A2 | 12/2012 | |
| EP | 2768059 A1 | 8/2014 | |
| GB | 150961 A | 1/1922 | |
| JP | H2-143779 A | 12/1990 | |
| JP | H08-213049 A | 8/1996 | |
| JP | 2009-007629 A | 1/1997 | |
| JP | H09-147845 A | 6/1997 | |
| JP | 2001-068150 A | 3/2001 | |
| JP | 2001110445 A | 4/2001 | |
| JP | 2002-237295 A | 8/2002 | |
| JP | 2005-011556 A | 1/2005 | |
| JP | 2008-047398 * | 2/2008 | ............ H01M 10/05 |
| JP | 2008047398 A | 2/2008 | |
| JP | 2009-140904 A | 6/2009 | |
| JP | 2010-073421 A | 4/2010 | |
| JP | 2010129412 A | 6/2010 | |
| KR | 20030081499 A | 10/2003 | |
| KR | 20050030438 A | 3/2005 | |
| KR | 20050099903 A | 10/2005 | |
| KR | 20070009231 A | 1/2007 | |
| KR | 10-0742739 | 7/2007 | |
| KR | 10-0804411 | 2/2008 | |
| KR | 10-2009-0009598 | 1/2009 | |
| KR | 2010-0077692 A | 7/2010 | |
| KR | 2010-0121387 A | 11/2010 | |
| KR | 20100127990 A | 12/2010 | |
| KR | 20110054557 A | 5/2011 | |
| KR | 2011-0089583 A | 8/2011 | |
| KR | 20110090768 A | 8/2011 | |
| KR | 10-1072292 B1 | 10/2011 | |
| WO | 2010/032362 A1 | 3/2010 | |
| WO | 2010052950 A1 | 5/2010 | |
| WO | WO 2010/052950 * | 5/2010 | .............. H01M 4/36 |
| WO | 2010/089991 A1 | 8/2010 | |
| WO | 2010107229 A2 | 9/2010 | |
| WO | 2011/093661 A2 | 8/2011 | |

OTHER PUBLICATIONS

International Search Report for PCT/KR2012/008397 mailed Mar. 29, 2013.
Search report from European Application No. 12 84 4371, dated Mar. 16, 2015.
International Search Report for Application No. PCT/KR2012/008403 dated Feb. 28, 2013.
International Search Report for PCT/KR2012/004365 mailed Jan. 2, 2013.
International Search Report for PCT/KR2012/008400 mailed Mar. 4, 2013.
International Search Report for PCT/KR2012/008401 mailed Feb. 28, 2013.
International Search Report for PCT/KR2012/008823 mailed on Feb. 28, 2013.

* cited by examiner

CABLE-TYPE SECONDARY BATTERY

CROSS-REFERENCE TO RELATED APPLICATION

This application is a continuation of International Application No. PCT/KR2012/008823 filed on Oct. 25, 2012, which claims priority under 35 USC 119(a) to Korean Patent Application Nos. 10-2011-0109564 and 10-2011-0109565 filed in the Republic of Korea on Oct. 25, 2011, and Korean Patent Application No. 10-2012-0118924 filed in the Republic of Korea on Oct. 25, 2012, the disclosures thereof are incorporated herein by reference.

TECHNICAL FIELD

The present invention relates to a cable-type secondary battery, which can freely change in shape, and more particularly to a cable-type secondary battery having an outer current collector comprising a conductive paste or a carbon fiber.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery consisting of a plurality of cathodes and anodes and separators interposed between each cathode and each anode. Korean Patent No. 0742739 discloses a thread-type flexible battery consisting of cathode threads and anode threads. However, these batteries have insufficient flexibility. Also, if the outer current collector of these batteries is deformed by external force, a short circuit may occur due to the contact between the outer and inner current collectors.

DISCLOSURE

Technical Problem

The present invention is designed to solve the problems of the prior art, and therefore it is an object of the present invention to provide a secondary battery having a new linear structure, which can easily change in shape, maintain excellent stability and performances as a secondary battery, and prevent a short circuit due to the deformation of an outer current collector.

Technical Solution

In order to achieve the objects, in accordance with one aspect of the present invention, there is provided a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer, and having an outer electrode active material layer and an outer current collector comprising at least one of a conductive paste and a carbon fiber.

In the outer electrode, the outer electrode active material layer may be formed to surround the outer surface of the separation layer, and the outer current collector may be formed to surround the outer surface of the outer electrode active material layer; the outer current collector may be formed to surround the outer surface of the separation layer, and the outer electrode active material layer may be formed to surround the outer surface of the outer current collector; the outer current collector may be formed to surround the outer surface of the separation layer, and the outer electrode active material layer may be formed to surround the outer surface of the outer current collector and come into contact with the separation layer; or the outer electrode active material layer may be formed to surround the outer surface of the separation layer, and the outer current collector may be formed to be included inside the outer electrode active material layer by being covered therein and to surround the outer surface of the separation layer with spacing apart therefrom.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the inner current collector may be selected from the group consisting of polyacetylene, polyaniline, polypyrrole, polythiophene, polysulfurnitride, indium tin oxide (ITO), silver, palladium, nickel, and a mixture thereof.

The conductive polymer used in the inner current collector may be selected from the group consisting of polyacetylene, polyaniline, polypyrrole, polythiophene, polysulfurnitride, and a mixture thereof.

Meanwhile, the conductive paste may be a metal paste or a carbon paste.

The metal paste may comprise metal powders selected from Ni, Al, Au, Ag, Al, Pd/Ag, Cr, Ta, Cu, Ba, ITO and a mixture thereof, and a binder.

The carbon paste may comprise carbon powders selected from graphite, carbon black, carbon nanotube and a mixture thereof, and a binder.

The binder used in the metal paste or carbon paste may be selected from an acryl-based resin, a vinyl-based resin, hydroxycellulose, methyl cellulose, nitrocellulose, ethylene cellulose, a modified resin of said resins, and a mixture thereof.

In the present invention, when the outer current collector comprises a carbon fiber, the carbon fiber may be wound on the outer surface of the outer electrode active material layer.

Also, when the outer current collector comprises a carbon fiber, the carbon fiber may be at least one arranged in parallel in the longitudinal direction on the outer surface of the outer electrode active material layer.

In addition, when the outer current collector comprises a carbon fiber, the carbon fiber may be a carbon fiber woven fabric surrounding the outer surface of the outer electrode active material layer.

In the present invention, the inner electrode may be an anode and the outer electrode may be a cathode, or the inner electrode may be a cathode and the outer electrode may be an anode.

When the inner electrode of the present invention is an anode and the outer electrode is a cathode, the inner electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and the outer electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof.

In the present invention, the separation layer may be an electrolyte layer or a separator.

The electrolyte layer may comprise an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiACl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Further, in accordance with another aspect of the present invention, there is provided a cable-type secondary battery having a horizontal cross section of a predetermined shape and extending longitudinally, comprising: an inner electrode having two or more electrodes arranged in parallel to each other, each electrode having an inner current collector, and an inner electrode active material layer formed on the surface of the inner current collector; a separation layer surrounding the outer surface of the inner electrodes to prevent a short circuit between electrodes; and an outer electrode surrounding the outer surface of the separation layer, and having an outer electrode active material layer and an outer current collector comprising at least one of a conductive paste and a carbon fiber.

Furthermore, in accordance with still another aspect of the present invention, there is provided a cable-type secondary battery having a horizontal cross section of a predetermined shape and extending longitudinally, comprising: an inner electrode having two or more electrodes arranged in parallel to each other, each electrode having an inner current collector, an inner electrode active material layer formed on the surface of the inner current collector, and a separation layer surrounding the outer surface of the inner electrode active material layer; and an outer electrode surrounding the outer surface of the inner electrodes, and having an outer electrode active material layer and an outer current collector comprising at least one of a conductive paste and a carbon fiber.

Advantageous Effects

In accordance with the present invention, an outer current collector which comprises a conductive paste or a carbon fiber has good flexibility and so a cable-type battery using such improves the flexibility of the cable-type battery. Also, since such conductive paste and carbon fiber are light materials, they can contribute to the lightening of cable-type secondary batteries. In addition, the outer current collector of the present invention is less subjected to excessive deformation such as bending or severe folding, due to its structural characteristic, even if excessive external force is applied to the cable-type battery, thereby preventing a short circuit due to the contact with the inner current collector and the release of an active material. Further, the outer current collector consisting of a conductive paste or a carbon fiber can have good contact characteristic with an active material to prevent the release of the active material.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
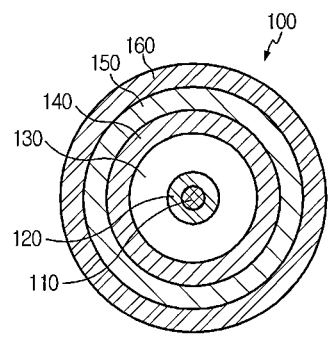
FIG. 1 shows a cable-type secondary battery having one inner electrode in accordance with one embodiment of the present invention.

FIG. 1 schematically shows a cable-type secondary battery according to one embodiment of the present invention. However, the configurations illustrated in the drawings and the embodiments herein are just preferable examples for the purpose of illustrations only, not intended to limit the scope of the disclosure, so it should be understood that other equivalents and modifications could be made thereto without departing from the spirit and scope of the disclosure.

The cable-type secondary battery 100 of the present invention has a horizontal cross section of a predetermined shape and extends longitudinally, and comprises an inner electrode having an inner current collector 110 and an inner electrode active material layer 120 surrounding the outer surface of the inner current collector 110; a separation layer 130 surrounding the outer surface of the inner electrode to prevent a short circuit between electrodes; and an outer electrode surrounding the outer surface of the separation layer 130, and having an outer electrode active material layer 140 and an outer current collector 150 comprising at least one of a conductive paste and a carbon fiber. The term 'a predetermined shape' used herein is not limited to any particular shape, and refers to any shape that does not damage the nature of the present invention. The cable-type secondary battery of the present invention has a horizontal cross section of a predetermined shape, a linear structure, which extends in the longitudinal direction, and flexibility, so it can freely change in shape.

The inner electrode of the present invention consists of the inner current collector 110 and the inner electrode active material layer 120 surrounding the outer surface of the inner current collector 110. Such an inner electrode is surrounded with the separation layer 130 for preventing a short circuit between electrodes on the outer surface thereof.

On the outer surface of the separation layer 130, an outer electrode is formed.

In the present invention, the outer electrode may be formed in various embodiments depending on the disposition of the outer electrode active material layer 140 and the outer current collector 150, which come into contact with the separation layer 130.

The outer electrode shown in FIG. 1 has the outer electrode active material layer 140 surrounding the outer surface of the separation layer 130 and the outer current collector 150 surrounding the outer surface of the outer electrode active material layer 140.

Also, the outer electrode of a cable-type secondary battery according to one embodiment of the present invention may have a structure in that the outer current collector is formed to surround the outer surface of the separation layer, and the outer electrode active material layer is formed to surround the outer surface of the outer current collector; a structure in that the outer current collector is formed to surround the outer surface of the separation layer, and the outer electrode active material layer is formed to surround the outer surface of the outer current collector and come into contact with the separation layer; or a structure in that the outer electrode active material layer is formed to surround the outer surface of the separation layer, and the outer current collector is formed to be included inside the outer electrode active material layer by being covered therein and to surround the outer surface of the separation layer with spacing apart therefrom.

In the present invention, the outer current collector 150 may be formed using a conductive paste or a carbon fiber, instead of a general metal.

The conductive paste refers to a paste capable of forming a general coating layer and used in a dried substrate when an electric current flows. Such a conductive paste is obtained by dispersing the powders of a conductive material in a binder.

The conductive paste which may be used in the present invention includes a metal paste or a carbon paste.

The metal paste preferably comprises metal powders selected from Ni, Al, Au, Ag, Al, Pd/Ag, Cr, Ta, Cu, Ba, ITO and a mixture thereof, and a binder.

The carbon paste preferably comprises carbon powders selected from graphite, carbon black, carbon nanotube and a mixture thereof, and a binder, and optionally, it may further comprise a conductive material.

The binder used in the metal paste or carbon paste is preferably selected from an acryl-based resin, a vinyl-based resin, hydroxycellulose, methyl cellulose, nitrocellulose, ethylene cellulose, a modified resin of said resins, and a mixture thereof.

Meanwhile, the carbon fiber is a type of fiber that is obtained from the calcination of organic fibers and composed mostly of carbon atoms, and it has high heat resistance and high elasticity. The carbon atoms, which compose the carbon fiber, are bonded together in hexagonal crystals that are aligned parallel to the long axis of the fiber. Such a crystal alignment gives strong physical properties. Several thousand carbon fibers are bundled together to form a tow, which may be used by itself or woven into a fabric. Such a carbon fiber consisting of only carbon atoms refers to filaments made of nongraphitic carbon which is obtained by spinning an organic material, such as an organic fiber or resin and petroleum pitch, into yarns, and carbonizing the spun yarns, followed by heat-treatment at a temperature of 3,000° C. or higher. The carbon fiber is commonly classified into a rayon-based, a pitch-based, and a PAN-based fiber according to a raw material. Among these, the pitch-based and PAN-based carbon fibers are largely used.

The outer current collector 150 of the present invention, which comprises a carbon fiber, is not particularly limited to its form. For example, the outer current collector 150 may be formed by winding a carbon fiber on the outer surface of the outer electrode active material layer 140, or arranging one or more carbon fibers parallel to each other in the longitudinal direction on the outer surface of the outer electrode active material layer 140. Also, the outer current collector 150 may comprise a carbon fiber woven fabric surrounding the outer surface of the outer electrode active material layer 140.

Such an outer current collector 150 which is formed from a conductive paste or a carbon fiber has good flexibility, and thus can be used in a cable-type secondary battery to improve the flexibility of the battery. Also, since the outer current collector 150 which is formed from a conductive paste or a carbon fiber is light, as compared with a conventional current collector made of a metal, it can contribute to the lightening of the battery. In addition, the outer current collector 150 comprising at least one of a conductive paste and a carbon fiber is less subjected to excessive deformation such as bending or severe folding, due to its good flexibility, even if excessive external force is applied to the cable-type battery, thereby preventing a short circuit due to the contact with the inner current collector 110.

In particular, when the outer current collector 150 is formed from a conductive paste, it is applied on the outer surface of the outer electrode active material layer 140 due to the physical property of the paste in the preparation of the battery, thereby exhibiting good contact characteristic with the outer electrode active material layer 140. From this, the release of the active material which is generated from the deformation of the battery by external force can be effectively prevented.

Meanwhile, the inner current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The inner current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

The inner electrode may be an anode and the outer electrode may be a cathode. Alternatively, the inner electrode may be a cathode and the outer electrode may be an anode.

In the present invention, the electrode active material layer allows ions to move through the current collector, and the movement of ions is caused by the interaction of ions such as intercalation/deintercalation of ions into and from the electrolyte layer.

Such an electrode active material layer may be divided into an anode active material layer and a cathode active material layer.

Specifically, when the inner electrode is an anode and the outer electrode is a cathode, the inner electrode active material layer becomes an anode active material layer and may be made of an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and the outer electrode active material layer becomes a cathode active material layer and may be made of an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

The separation layer of the present invention may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

The electrolyte layer of the present invention may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Hereinafter, a cable-type secondary battery according to one embodiment of the present invention and the manufacture thereof will be briefly explained with reference to FIG. 1.

The cable-type secondary battery 100 according to one embodiment of the present invention comprises an inner electrode which has the inner current collector 110 having a horizontal cross section of a predetermined shape and extending longitudinally, and the inner electrode active material layer 120 surrounding the outer surface of the inner current collector 110; a separation layer 130 surrounding the outer surface of the inner electrode to prevent a short circuit between electrodes; and an outer electrode surrounding the outer surface of the separation layer 130, and having an outer electrode active material layer 140 and an outer current collector 150 comprising at least one of a conductive paste and a carbon fiber.

First, the inner current collector 110 is provided in the form of a wire, and the inner electrode active material layer 120 is formed on the surface of the inner current collector 110 by way of coating. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

Subsequently, the separation layer 130 which is an electrolyte layer is formed to surround the inner electrode active material layer 120. The method for forming the separation layer 130, an electrolyte layer, is not particularly limited, but an extrusion coating method is preferably used to facilitate the manufacturing process due to the nature of the linear cable-type secondary battery.

On the outer surface of the separation layer 130 formed by the coating of an electrolyte, the outer electrode active material layer 140 is formed by way of coating. The coating method of the inner electrode active material layer 120 may be identically applied to the outer electrode active material layer 140.

Then, a silver paste is applied on the outer surface of the outer electrode active material layer 140 to form the outer current collector 150. Thereby, an electrode assembly is prepared.

Finally, the protection coating 160 is formed to surround the outer surface of the electrode assembly. The protection coating 160 is an insulator and is formed on the outermost surface for the purpose of protecting the electrodes against moisture in the air and external impacts. As the protection coating 160, conventional polymer resins, for example, PVC, HDPE and epoxy resins may be used.

Hereinafter, another embodiment of the present invention will be explained with reference to FIGS. 2 and 3.

Figure 2:
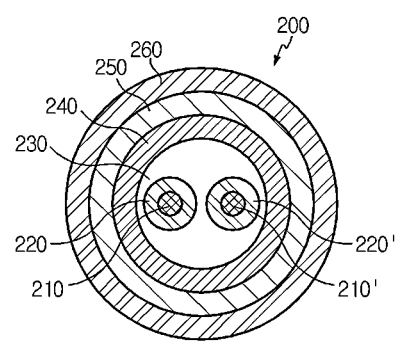
FIG. 2 shows a cable-type secondary battery having multiple inner electrodes in accordance with one embodiment of the present invention.

Referring to FIG. 2, the cable-type secondary battery 200 according to one embodiment of the present invention comprises two or more inner electrodes arranged parallel to each other, each inner electrode having each inner current collector 210, 210' and each inner electrode active material layer 220, 220' surrounding the outer surface of the inner current collector 210, 210'; the separation layer 230 surrounding the outer surface of the inner electrodes to prevent a short circuit between electrodes; an outer electrode surrounding the outer surface of the separation layer 230, and having the outer electrode active material layer 240 and the outer current collector 250 comprising at least one of a conductive paste and a carbon fiber. Such a cable-type secondary battery 200 has the inner electrode consisting of multiple electrodes, thereby allowing controlling the balance between a cathode and anode and preventing a short circuit.

As shown in FIG. 2, the outer electrode has the outer electrode active material layer 240 surrounding the outer surface of the separation layer 230, and the outer current collector 250 surrounding the outer surface of the separation layer 240.

Also, the outer electrode may be formed in a structure having the outer current collector formed to surround the outer surface of the separation layer, and the outer electrode active material layer formed to surround the outer surface of the outer current collector; a structure having the outer current collector formed to surround the outer surface of the separation layer, and the outer electrode active material layer formed to surround the outer surface of the outer current collector and to come into contact with the separation layer; or a structure having the outer electrode active material layer formed to surround the outer surface of the separation layer, and the outer current collector formed to be included inside the outer electrode active material layer by being covered therein and to surround the outer surface of the separation layer with spacing apart therefrom.

Figure 3:
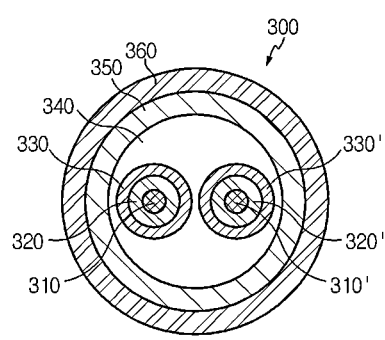
FIG. 3 shows a cable-type secondary battery having an inner electrode provided with a separation layer in accordance with one embodiment of the present invention.

Further, referring to FIG. 3, the cable-type secondary battery 300 according to one embodiment of the present invention comprises two or more inner electrodes arranged parallel to each other, each inner electrode having each inner current collector 310, 310', each inner electrode active material layer 320, 320' surrounding the outer surface of the inner current collector 310, 310', and each separation layer 330, 330' surrounding the outer surface of the inner electrode active material layer 320, 320'; an outer electrode surrounding the outer surface of the inner electrodes, and having the outer electrode active material layer 340 and the outer current collector comprising at least one of a conductive paste and a carbon fiber. Such a cable-type secondary battery 300 has the inner electrode consisting of multiple electrodes, thereby allowing controlling the balance between a cathode and anode and preventing a short circuit.

As shown in FIG. 3, the outer electrode has the outer electrode active material layer 340 surrounding the outer surface of the inner electrodes, and the outer current collector 350 surrounding the outer surface of the separation layer 340.

Also, the outer electrode may be formed in a structure having the outer current collector formed to surround the outer surface of the inner electrodes, and the outer electrode active material layer formed to surround the outer surface of the outer current collector; a structure having the outer current collector formed to surround the outer surface of the inner electrodes, and the outer electrode active material layer formed to surround the outer surface of the outer current collector and to come into contact with the inner electrodes; or a structure having the outer electrode active material layer formed to surround the outer surface of the inner electrodes, and the outer current collector formed to be included inside the outer electrode active material layer by being covered therein and to surround the outer surface of the inner electrodes with spacing apart therefrom.

What is claimed is:

1. A cable-type secondary battery, comprising:
    an inner electrode having an inner current collector and an inner electrode active material layer surrounding an outer surface of the inner current collector;
    a separation layer surrounding an outer surface of the inner electrode to prevent a short circuit between electrodes; and
    an outer electrode surrounding an outer surface of the separation layer, and having an outer electrode active material layer and an outer current collector comprising at least one of a conductive paste and a carbon fiber, wherein in the outer electrode,
the outer current collector is formed to surround the outer surface of the separation layer, and the outer electrode active material layer is formed to surround an outer surface of the outer current collector; or
the outer current collector is formed to surround the outer surface of the separation layer, and the outer electrode active material layer is formed to surround the outer surface of the outer current collector and come into contact with the separation layer.

2. The cable-type secondary battery according to claim 1, wherein the inner current collector is made of stainless steel, aluminum, nickel, titanium, sintered carbon, or copper; stainless steel treated with carbon, nickel, titanium or silver on a surface thereof; an aluminum-cadmium alloy; a non-conductive polymer treated with a conductive material on a surface thereof; or a conductive polymer.

3. The cable-type secondary battery according to claim 2, wherein the conductive material is selected from the group consisting of polyacetylene, polyaniline, polypyrrole, polythiophene, polysulfurnitride, indium tin oxide (ITO), silver, palladium, nickel, and a mixture thereof.

4. The cable-type secondary battery according to claim 2, wherein the conductive polymer is selected from the group consisting of polyacetylene, polyaniline, polypyrrole, polythiophene, polysulfurnitride, and a mixture thereof.

5. The cable-type secondary battery according to claim 1, wherein the conductive paste is a metal paste or a carbon paste.

6. The cable-type secondary battery according to claim 5, wherein the metal paste comprises metal powders selected from Ni, Al, Au, Ag, Al, Pd/Ag, Cr, Ta, Cu, Ba, ITO and a mixture thereof, and a binder.

7. The cable-type secondary battery according to claim 5, wherein the carbon paste comprises carbon powders selected from graphite, carbon black, carbon nanotube and a mixture thereof, and a binder.

8. The cable-type secondary battery according to claim 6, wherein the binder is selected from an acryl-based resin, a vinyl-based resin, hydroxycellulose, methyl cellulose, nitrocellulose, ethyl cellulose, a modified resin of said resins, and a mixture thereof.

9. The cable-type secondary battery according to claim 1, wherein when the outer current collector comprises a carbon fiber, the carbon fiber is at least two carbon fibers arranged in parallel.

10. The cable-type secondary battery according to claim 1, wherein when the outer current collector comprises a carbon fiber, the carbon fiber is a carbon fiber woven fabric.

11. The cable-type secondary battery according to claim 1, wherein the inner electrode is an anode and the outer electrode is a cathode, or the inner electrode is a cathode and the outer electrode is an anode.

12. The cable-type secondary battery according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and
the outer electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

13. The cable-type secondary battery according to claim 1, wherein when the inner electrode is a cathode and the outer electrode is an anode,
the inner electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof.

14. The cable-type secondary battery according to claim 1, wherein the separation layer is an electrolyte layer or a separator.

15. The cable-type secondary battery according to claim 14, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

16. The cable-type secondary battery according to claim 14, wherein the electrolyte layer further comprises a lithium salt.

17. The cable-type secondary battery according to claim 16, wherein the lithium salt is selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

18. The cable-type secondary battery according to claim 14, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

19. A cable-type secondary battery, comprising:
an inner electrode having two or more electrodes arranged in parallel to each other, each electrode having an inner current collector, and an inner electrode active material layer formed on a surface of the inner current collector;
a separation layer surrounding an outer surface of the inner electrodes to prevent a short circuit between electrodes; and an outer electrode surrounding an outer surface of the separation layer, and having an outer electrode active material layer and an outer current collector comprising at least one of a conductive paste and a carbon fiber, wherein in the outer electrode, the outer current collector is formed to surround the outer surface of the separation layer, and the outer electrode active material layer is formed to surround an outer surface of the outer current collector; or the outer current collector is formed to surround the outer surface of the separation layer, and the outer electrode active material layer is formed to surround the outer surface of the outer current collector and come into contact with the separation layer.

20. A cable-type secondary battery, comprising:

an inner electrode having two or more electrodes arranged in parallel to each other, each electrode having an inner current collector, an inner electrode active material layer formed on a surface of the inner current collector, and a separation layer surrounding an outer surface of the inner electrode active material layer; and an outer electrode surrounding an outer surface of the inner electrodes, and having an outer electrode active material layer and an outer current collector comprising at least one of a conductive paste and a carbon fiber wherein in the outer electrode, the outer current collector is formed to surround the outer surface of the inner electrode, and the outer electrode active material layer is formed to surround an outer surface of the outer current collector; or the outer current collector is formed to surround the outer surface of the inner electrode, and the outer electrode active material layer is formed to surround the outer surface of the outer current collector and come into contact with the inner electrode.

* * * * *